(12) United States Patent
Onishi et al.

(10) Patent No.: US 8,921,005 B2
(45) Date of Patent: Dec. 30, 2014

(54) FUEL CELL SEPARATOR MANUFACTURING METHOD AND FUEL CELL SEPARATOR

(75) Inventors: Hirofumi Onishi, Aichi-gun (JP); Jin Hak Kim, Nagoya (JP); Yusuke Watanabe, Toyota (JP); Makoto Yoshida, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 632 days.

(21) Appl. No.: 12/742,341

(22) PCT Filed: Oct. 20, 2008

(86) PCT No.: PCT/JP2008/068948
§ 371 (c)(1),
(2), (4) Date: May 11, 2010

(87) PCT Pub. No.: WO2009/063724
PCT Pub. Date: May 22, 2009

(65) Prior Publication Data
US 2010/0273092 A1  Oct. 28, 2010

(30) Foreign Application Priority Data

Nov. 12, 2007 (JP) ................................. 2007-293220

(51) Int. Cl.
*H01M 8/02* (2006.01)
*H01M 8/00* (2006.01)
*H01M 8/10* (2006.01)

(52) U.S. Cl.
CPC .......... *H01M 8/0228* (2013.01); *H01M 8/0206* (2013.01); *H01M 2008/1095* (2013.01); *Y02E 60/50* (2013.01); *H01M 8/0221* (2013.01)
USPC .......................................... 429/514; 427/115

(58) Field of Classification Search
None
See application file for complete search history.

(56) References Cited

U.S. PATENT DOCUMENTS

| 2005/0100771 A1* | 5/2005 | Vyas et al. ...................... 429/32 |
| 2006/0292428 A1* | 12/2006 | Suh ................................. 429/35 |
| 2007/0007141 A1* | 1/2007 | Maeda et al. ................... 205/57 |

FOREIGN PATENT DOCUMENTS

| JP | 53-102278 A | | 9/1978 |
| JP | 11-345620 A | | 12/1999 |
| JP | 2000-100452 A | | 4/2000 |
| JP | 2001-068129 A | | 3/2001 |
| JP | 2002-025574 A | | 1/2002 |
| JP | 2002-063914 A | | 2/2002 |
| JP | 2002063914 A | * | 2/2002 |
| JP | 2005-005137 A | | 1/2005 |

(Continued)

*Primary Examiner* — Ula C. Ruddock
*Assistant Examiner* — Daniel Gatewood
(74) *Attorney, Agent, or Firm* — Kenyon & Kenyon LLP

(57) ABSTRACT

A uniform and dense resin coat is formed on a surface of a peripheral region of a fuel cell separator. However, the formed resin coat may contain defects (holes). With the present invention, however, any such defects in the resin coat are coated with a metal coat. That is, when depositing metal in complex ions on the fuel cell separator by an electrodeposition process, the metal is adhered not only to a power generation region but also to a portion where the surface (separator base material surface) is exposed by the defects of the resin coat, thereby forming the metal coat on the defects. Thus, it is possible to improve the corrosion resistance of the fuel cell separator as compared to the case that the surface of the separator base material is exposed at the portions of the defects of the resin coat.

4 Claims, 6 Drawing Sheets

<STEP 4 (ENLARGED)>

(PERIPHERAL REGION)

(56) References Cited

FOREIGN PATENT DOCUMENTS

| | | | |
|---|---|---|---|
| JP | 2005005137 A | * | 1/2005 |
| JP | 2006-164897 A | | 6/2006 |
| JP | 2007-012300 A | | 1/2007 |
| JP | 2007-511057 A | | 4/2007 |
| JP | 2008-065993 A | | 3/2008 |
| JP | 2008-065995 A | | 3/2008 |

* cited by examiner

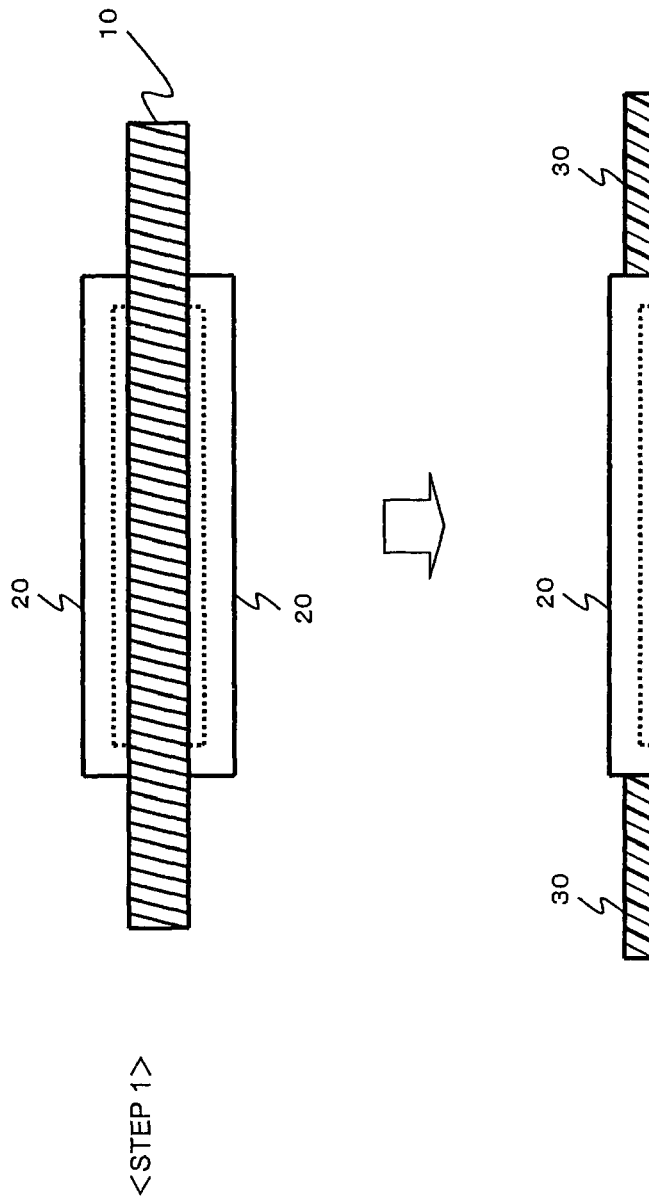

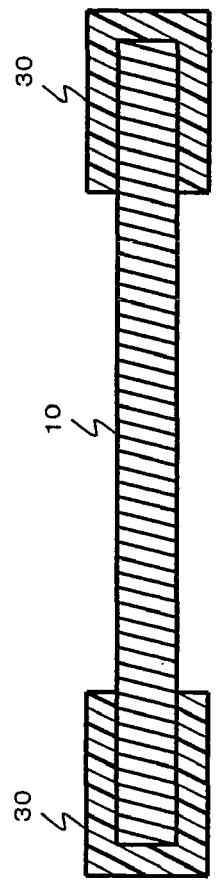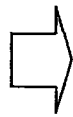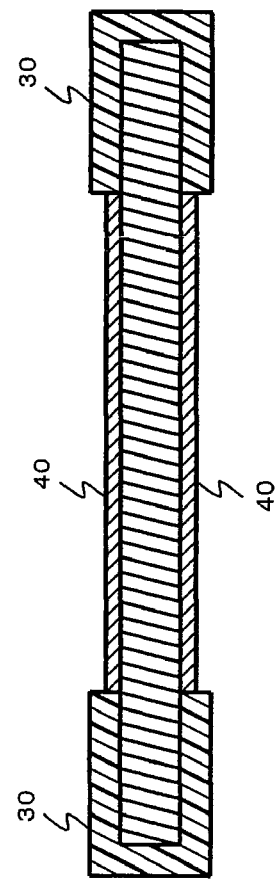

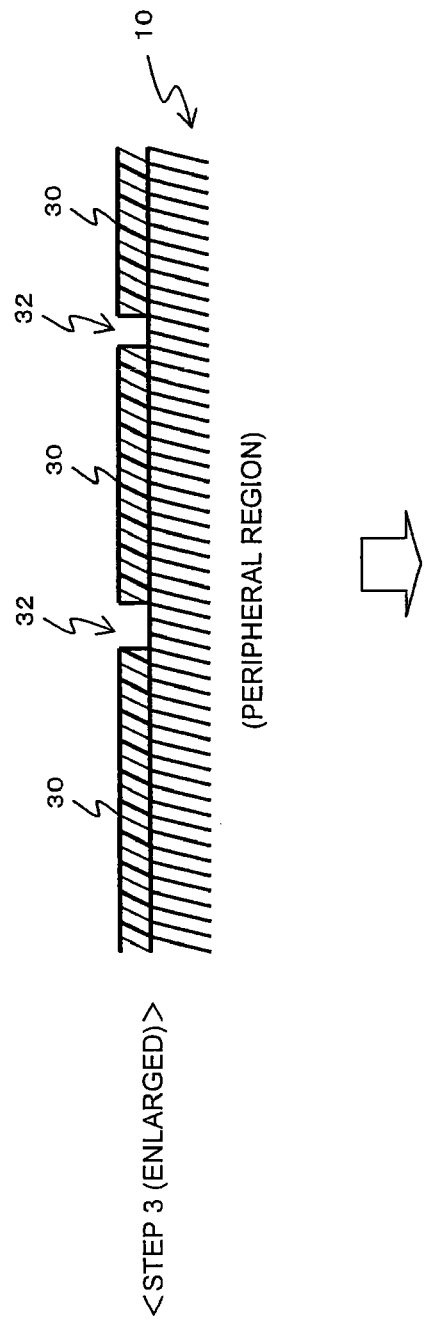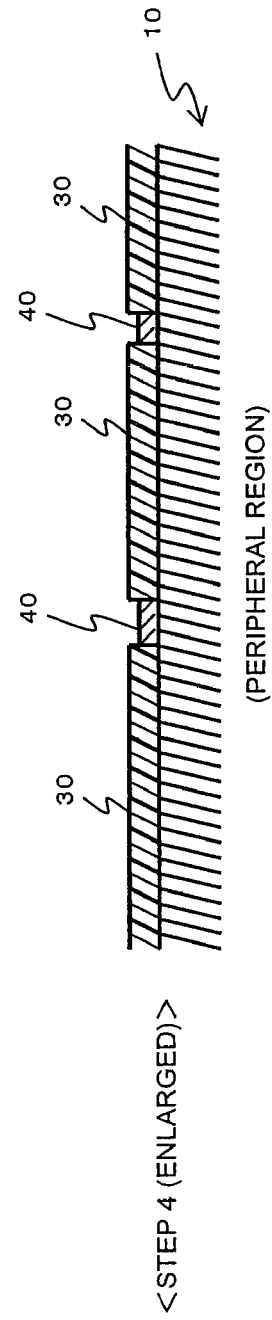

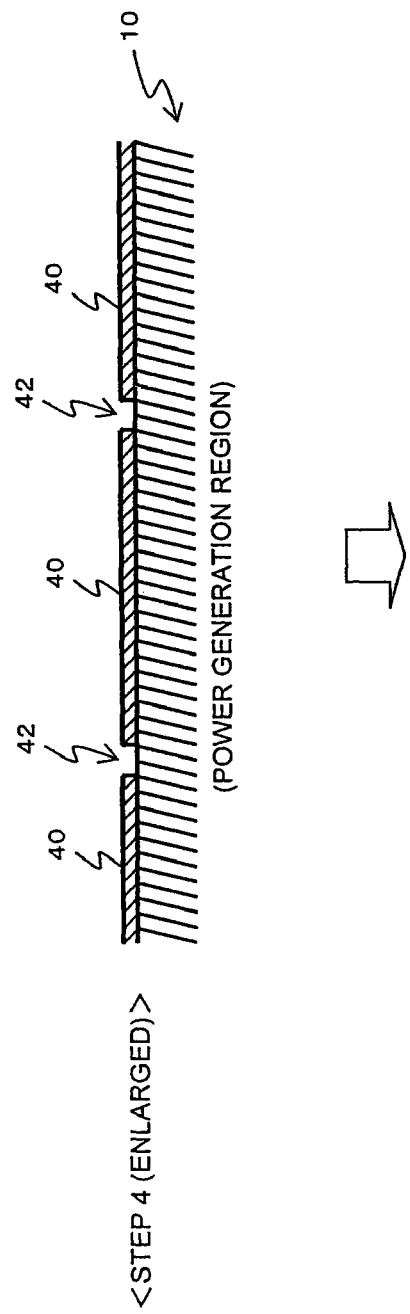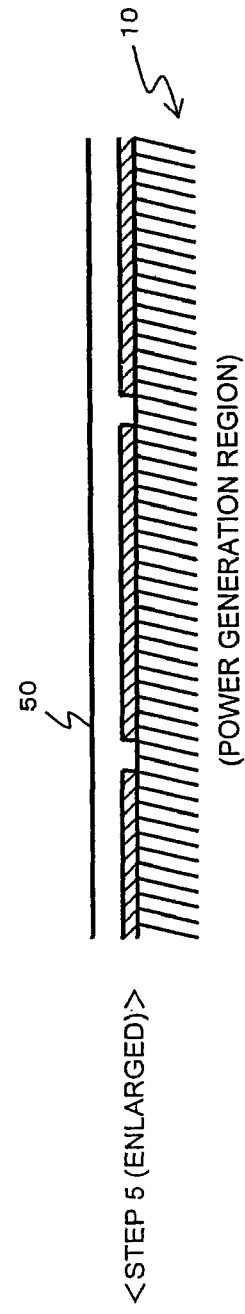

FUEL CELL SEPARATOR MANUFACTURING METHOD AND FUEL CELL SEPARATOR

This is a 371 national phase application of PCT/JP2008/068948 filed 20 Oct. 2008, claiming priority to Japanese Patent Applications No. JP2007-293220 filed 12 Nov. 2007, the contents of which are incorporated herein by reference.

FIELD OF THE INVENTION

The present invention relates to a fuel cell separator, and more particularly to a surface treatment technology of a fuel cell separator.

BACKGROUND OF THE INVENTION

Fuel cells which convert chemical energy obtained by reacting a hydrogen-containing fuel gas and an oxygen-containing oxidizing gas into electric energy are known. Such a fuel cell may, for example, be installed on a vehicle and used as a power source for a vehicle driving motor.

To prevent water or the like generated by a chemical reaction from causing corrosion, portions of components used for the fuel cell is required to have corrosion resistance. For example, a separator (fuel cell separator) used for the fuel cell may be subjected to a surface treatment for enhancing the corrosion resistance. As such, there have been proposed various types of technologies related to the surface treatment of the fuel cell separator.

For example, Japanese Patent Publication JP-A 2007-12300 (Patent Reference 1) describes a technology of forming a resin coat on a surface of a separator in order to enhance the corrosion resistance of the separator.

Japanese Patent Publication JP-A 2001-68129 (Patent Reference 2) discloses a technology of sealing pin holes in a corrosion resistant film formed on a surface of a separator with a resin, and Publication JP-A 2002-63914 (Patent Reference 3) discloses a technology of forming a multilayer coat comprising a base material coat, a noble metal coat and a carbon material coat on a surface of a separator.
Patent Reference 1: JP-A 2007-12300 (KOKAI)
Patent Reference 2: JP-A 2001-68129 (KOKAI)
Patent Reference 3: JP-A 2002-63914 (KOKAI)

SUMMARY OF THE INVENTION

Problems to be Solved by the Invention

The separator described in the Patent Reference 1 creates a problem in that a large amount of metal is required because the resin coat is formed over a metal coat.

The present invention reduces the amount of metal used for a metal coat layer of a fuel cell separator comprising a separator base material, a resin coat and a metal coat.

Means for Solving the Problem

To achieve the above object, the method for manufacturing a fuel cell separator according to a preferable aspect of the invention is a method for manufacturing a fuel cell separator by forming a resinous coat and a metallic coat on a surface of a separator base material, comprising a resinous coat forming step of forming the resinous coat on a target region of the surface of the separator base material, and a metallic coat forming step of forming the metallic coat on an exposed portion of the surface of the separator base material. According to this aspect, an amount of a used metal for a metal coat layer can be reduced in the fuel cell separator comprising the separator base material, the resinous coat and the metallic coat.

According to another preferable aspect, the metallic coat forming step includes an electroplating treatment to perform electrodeposition of metal on the exposed portion of the surface of the separator base material. According to this aspect, the amount of the used metal for the metal coat layer can be reduced in the fuel cell separator comprising the separator base material, the resin coat and the metal coat in comparison with a case that the metal coat layer is formed on the entire region of the layer below the resin coat layer.

A preferable aspect may also include a paste coating step of coating a conductive paste on the metallic coat surface of the separator base material on which the metallic coat is formed. Accordingly, the amount of the used metal for the metal coat layer can be reduced in the fuel cell separator comprising the separator base material, the resin coat and the metal coat.

According to the preferable aspect, the exposed portion of the surface of the separator base material includes defect portions of the formed resinous coat.

To achieve the above object, the fuel cell separator according to a preferable aspect of the invention is a fuel cell separator having a resinous coat and a metallic coat on a surface of a separator base material formed to have a plate shape, wherein the separator base material has a power generation region facing a membrane-electrode assembly and a peripheral region including openings which function as manifolds, the resinous coat is formed on the surface of the peripheral region of the separator base material, and the metallic coat is formed on an exposed portion of the surface of the separator base material.

According to a preferable aspect, the metallic coat is formed on the surface of the power generation region of the separator base material, and a conductive paste is coated on the metallic coat surface on the surface side facing the membrane-electrode assembly of the separator base material, on which the metallic coat is formed.

According to the preferable aspect, the exposed portion of the surface of the separator base material includes defect portions of the formed resinous coat.

Effect of the Invention

By employing the present invention, the amount of metal used for the metal coat layer can be reduced in fuel cell separators comprising a separator base material, a resin coat, and a metal coat.

BRIEF DESCRIPTION OF THE DRAWINGS

FIGS. 2A and 2B are diagrams illustrating a resin coat forming treatment.

FIGS. 3A and 3B are diagrams illustrating a metal coat forming treatment.

FIGS. 5A and 5B are diagrams illustrating coating on defects in the resin coat.

FIGS. 6A and 6B are diagrams illustrating coating on defects in the metal coat.

EXPLANATION OF REFERENCE NUMERALS

10: Fuel cell separator, 12: power generation region, 30: resin coat, 40: metal coat, 50: conductive paste.

DETAILED DESCRIPTION

A preferable embodiment of the invention are described below.

Figure 1:
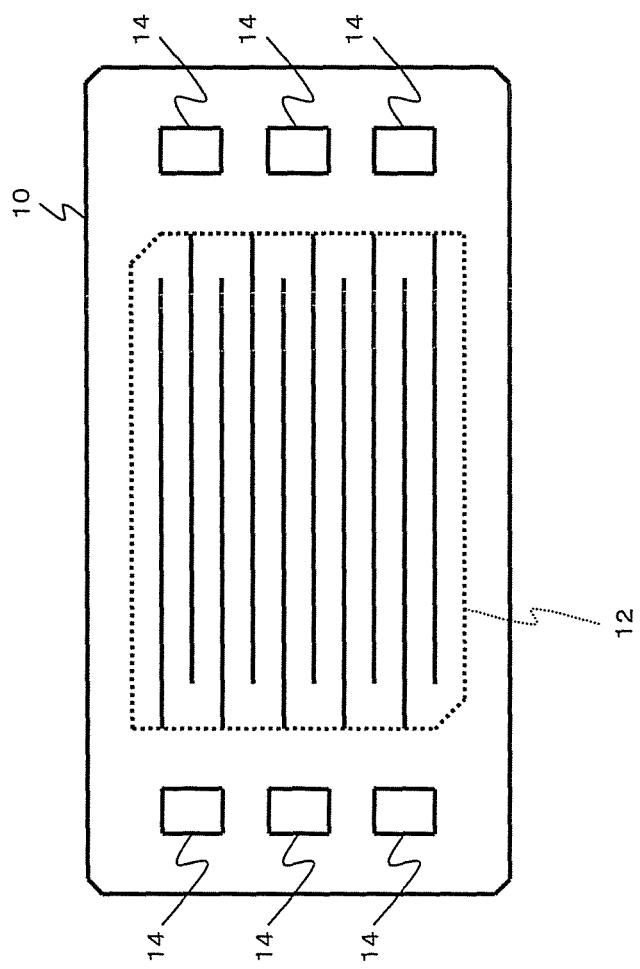
FIG. 1 is a schematic diagram of a fuel cell separator 10 according to the present invention.

FIG. 1 is a diagram illustrating a preferable embodiment of the invention, and FIG. 1 shows a schematic diagram of a fuel cell separator 10 according to the invention. The fuel cell separator 10 is suitable as a part of the fuel cell which is mounted on, for example, a vehicle, but the use of the fuel cell separator 10 is not limited to the vehicle.

The fuel cell separator 10 is a plate-like member having substantially rectangular front and rear surfaces. The fuel cell separator 10 is formed of a material having a conductive property such as a SUS material or carbon. The fuel cell separator 10 has a power generation region 12 facing MEA (membrane-electrode assembly) at the center of the substantially rectangular surface. The power generation region 12 is appropriately provided with recesses and projections for reaction gas (fuel gas or oxidizing gas) passages and cooling water passages.

When the MEA is held between two fuel cell separators 10 to form a battery cell, the MEA is stacked to face the power generation region 12 of the fuel cell separator 10. A resinous frame or the like may be provided between the fuel cell separator 10 and the MEA. A plurality of battery cells having the MEA held between the two fuel cell separators 10 are stacked to form a fuel cell.

The fuel cell separator 10 has a plurality of openings 14 in the peripheral end portions of the substantially rectangular surface, specifically in the peripheral region excluding the power generation region 12 surrounding the power generation region 12. In FIG. 1, the fuel cell separator 10 has three openings 14 in both end portions in its longitudinal direction. The positions and shapes of the openings 14 shown in FIG. 1 are examples only.

The openings 14 formed in the fuel cell separator 10 function as manifolds when the fuel cell is formed from this fuel cell separator 10. The water and the like generated by the chemical reaction of the fuel gas and the oxidizing gas flow into the manifolds. Therefore, a resin coat which is one example of the resinous coat is applied to the openings 14 forming the manifolds to prevent corrosion due to the generated water and the like.

The resin coat is formed to cover almost the entire peripheral region of the fuel cell separator 10. In other words, the resin coat is formed on the region other than the power generation region 12 of the fuel cell separator 10 shown in FIG. 1. Meanwhile, a metal coat, as one example of a metallic coat, is formed on most of the power generation region 12. The coating treatment (surface treatment) of this embodiment is described below. For the parts (structure) shown in FIG. 1, the reference numerals of FIG. 1 are used in the following description.

FIGS. 2A, 2B, 3A, 3B and FIG. 4 are diagrams illustrating a coating treatment of the fuel cell separator 10. FIGS. 2A, 2B, 3A, 3B and FIG. 4 each show a treatment state of the surfaces of the fuel cell separator 10 in each of step 1 to step 5. The cross sections shown in FIGS. 2A, 2B, 3A, 3B and FIG. 4 are of the fuel cell separator 10 of FIG. 1 viewed from its side surface (long side surface). The cross sections shown in FIGS. 2A, 2B, 3A, 3B and FIG. 4 are schematic diagrams comprehensibly illustrating the treatment state of the surfaces of the fuel cell separator 10, and the individual coats may have a thickness or other characteristics which differ from those of coats illustrated in the drawings.

FIGS. 2A and 2B are diagrams illustrating a forming treatment of a resin coat 30. The resin coat 30 is formed over almost the entire area of the peripheral region of the fuel cell separator 10. To form the resin coat on the peripheral region of the fuel cell separator 10, the region not requiring the resin coat is masked using a masking jig or the like.

In step 1, for example, the power generation region 12 on the front and rear surfaces of the fuel cell separator 10 is masked by a masking jig 20 which holds both the front and rear surfaces of the plate-like fuel cell separator 10. In step 2, a resin coat 30 is formed on the surface (separator base material surface) of the fuel cell separator 10 with the power generation region 12 kept in the state masked by the masking jig 20.

An electrodeposition process is used to coat the resin coat 30, and a cationic resin which is obtained by partially ionizing resin powder is electrodeposited on the surface of the fuel cell separator 10. In the electrodeposition process, a terminal is contacted to the fuel cell separator 10 in a solution containing the cationic resin to apply a cathode voltage, and an anode voltage is applied to a counter electrode, whereby the cationic resin is drawn toward the fuel cell separator 10 to adhere the cationic resin to the surface of the fuel cell separator 10. Because the fuel cell separator 10 is masked, the cationic resin adheres only to the region not masked by the masking jig 20, namely, the peripheral region of the fuel cell separator 10. A uniform and dense resin powder is coated on the surface of the peripheral region of the fuel cell separator 10 using such an electrodeposition process.

After the resin powder is coated on the surface of the fuel cell separator 10 by the electrodeposition process, the masking jig 20 is removed from the fuel cell separator 10 in this embodiment, and a baking treatment is performed to bake the resin powder on the surface of the fuel cell separator 10. And, the resin powder adhered to the surface of the fuel cell separator 10 is fused to make the resin coat more uniform and dense, and the resin is cured. Thus, the resin coat 30 is formed on the surface of the fuel cell separator 10.

FIGS. 3A and 3B are diagrams illustrating a treatment of forming a metal coat 40. In step 3, the baking treatment of the resin powder is performed to form the resin coat 30 on the surfaces of the fuel cell separator 10, and in step 4, the metal coat 40 is formed on the power generation region from which the masking jig is removed.

The electrodeposition process is also used for coating the metal coat 40, and ionized metal (e.g., gold complex ions) is electrodeposited on the surface of the fuel cell separator 10. In the electrodeposition process, a terminal is contacted to the fuel cell separator 10 in a solution containing metal complex ions, and an electric current is passed with the fuel cell separator 10 determined as the cathode to draw the complex ions toward the fuel cell separator 10. Thus, the gold in the complex ions is adhered to the surface of the fuel cell separator 10. Because the resin coat 30 is formed on the fuel cell separator 10, the resin coat 30 having an electric insulating property functions as a mask. Therefore, the metal in the complex ions adheres only to the region where the resin coat 30 is not formed, namely to the power generation region of the fuel cell separator 10, to form the metal coat 40 (plated film).

Figure 4:
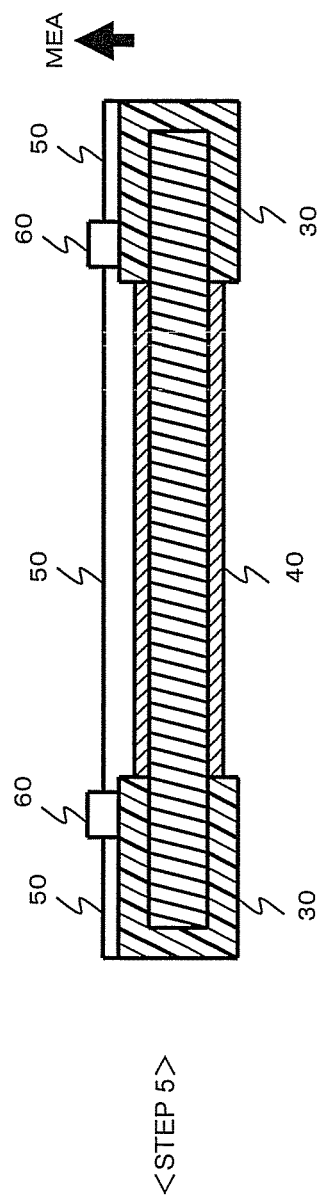
FIG. 4 is a diagram illustrating a conductive paste coating treatment.

FIG. 4 is a diagram illustrating a treatment for coating a conductive paste 50. When the resin coat 30 is formed on the surface of the peripheral region of the fuel cell separator 10 and the metal coat 40 is formed on the surface of the power generation region of the fuel cell separator 10, the conductive paste 50 is coated in step 5. The conductive paste 50 is coated only on the surface of the fuel cell separator 10 which faces the MEA, namely the top surface facing the MEA in FIG. 4. The conductive paste 50 is, for example, a carbon paste. For example, an adhesive 60 is put on the surface of the resin coat 30 near the boundary between the resin coat 30 and the metal coat 40.

As described above, the resin coat 30, the metal coat 40 and the conductive paste 50 are formed on the fuel cell separator 10 by performing step 1 to step 5 of the treatment illustrated in FIGS. 2A, 2B, 3A, 3B and FIG. 4. In this embodiment, when the metal coat 40 is formed in step 4, the metal coat 40 is also formed on a portion where the surface (separator base material surface) of the fuel cell separator 10 is exposed because of the defects of the resin coat 30 to coat on the defects.

FIGS. 5A and 5B are diagrams illustrating coating on defects 32 of the resin coat 30. FIGS. 5A and 5B show an enlarged diagram of the peripheral region part of the fuel cell separator 10 in step 3 and step 4 described above, that is, an enlarged diagram of a part where the resin coat 30 is formed.

The uniform and dense resin coat 30 is formed on the surface of the peripheral region of the fuel cell separator 10 by the electro deposition process and the baking treatment. However, the resin coat 30 formed in the step 3 might contain defects 32 (extremely small holes) as shown in FIG. 5A.

In this embodiment, even when the formed resin coat 30 has the defects 32, the metal coat 40 formed in the step 4 is coated on the defects 32. Namely, when the metal in the complex ions is adhered to the fuel cell separator 10 by the electro-deposition process in the step 4, the metal is adhered not only to the power generation region but also to the portions where the surface (separator base material surface) is exposed due to the defects 32 of the resin coat 30 to form the metal coat 40 on the portions of defects 32 as shown in FIG. 5B.

Thus, by employing the present invention according go this embodiment, it is possible to improve the corrosion resistance of the fuel ceil separator 10 in comparison with a case that the surface of the separator base material is exposed at the portions of defects 32 of the resin coat 30. In addition, when the conductive paste 50 is formed in step 5 in this embodiment, the portions where the surface (separator base material surface) of the fuel cell separator 10 is exposed because of the defects of the metal coat 40 are coated.

FIGS. 6A and 6B are diagrams illustrating coating on the defects 42 of the metal coat 40. FIGS. 6A and 6B show an enlarged diagram of the power generation region of the fuel cell separator 10 in step 4 and step 5 described above, namely an enlarged diagram of a part where the metal coat 40 is formed.

The uniform and dense metal coat 40 is formed on the surface of the power generation region of the fuel cell separator 10 by the electro-deposition process. However, the metal coat 40 formed in the step 4 might contain the defects 42 (holes) as shown in FIG. 6A.

With the invention according to this embodiment, even when the formed metal coat 40 contains the defects 42, the conductive paste 50 coated in step 5 coats the defects 42 as shown in FIG. 6B. Therefore, the corrosion resistance of the fuel cell separator 10 is enhanced in this embodiment in comparison with the case that the surface of the separator base material remains exposed at the portions of the defects 42 of the metal coat 40.

A preferable embodiment of the invention was described above. By employing a structure according to the above-described embodiment, the present invention makes it possible to form a thinner separator than with the conventional two-layered structure of the resin coat and the metal coat. According to the embodiment, the metal coat 40 is formed only on the power generation region and the very small defect parts of the resin coat 30. Therefore, compared to the case when the metal coat 40 is coated on the entire fuel cell separator 10, the amount of the metal coat 40 can be reduced and the costs can be reduced. According to this embodiment, the power generation region and the defects of the resin coat are coated by one step (step 4 in FIGS. 3B and 5B). Therefore, the number of steps can be reduced in comparison with the case that the coating on the power generation region and the coating on the defects in the resin coat are performed in different steps.

It is to be noted that the foregoing embodiment and the effects thereof are to be considered as illustrative only in all respects and not limitative of the scope of the invention. For example, although in the above-described examples the electrodeposition process is used to form the resin, the resin coat may be realized by injection molding or the like instead of the electrodeposition process. Also, for the metal coat, a coating treatment such as coating, vapor deposition, sputtering, or ion plating may be used instead of the electrodeposition process. The metal coat may also be realized by copper, silver, or platinum instead of gold (Au). It is also preferable to perform, for example, a base treatment having a conductive property.

What is claimed is:

1. A method for manufacturing a fuel cell separator by forming a resinous coat and a metallic coat on a surface of a separator base material having a power generation region facing a membrane-electrode assembly and a peripheral region including openings which function as manifolds, comprising:
   a resinous coat forming step of forming a resinous coat on the surface of the peripheral region of the separator base material, and
   a metallic coat forming step of simultaneously forming a metallic coat on a surface of the power generation region of the separator base material and a surface of the separator base material exposed at a bottom of extremely small holes contained in the resinous coat, wherein:
   the metallic coat forming step is an electroplating treatment to perform electro-deposition of metal on the surfaces of the separator base material.

2. A fuel cell separator having a resinous coat and a metallic coat on a surface of a separator base material formed to have a plate shape, wherein:
   the separator base material has a power generation region facing a membrane-electrode assembly and a peripheral region including openings which function as manifolds,
   the resinous coat is formed on the surface of the peripheral region of the separator base material,
   the metallic coat is formed by an electroplating treatment to simultaneously electro-deposit metal on a surface of the power generation region of the separator base material and a surface of the separator base material exposed at a bottom of extremely small holes contained in the resinous coat.

3. The method for manufacturing a fuel cell separator according to claim 1, further comprising:
   a paste coating step of coating a conductive paste on the metallic coat surface of the separator base material on which the metallic coat is formed.

4. The fuel cell separator according to claim 2, wherein:
a conductive paste is coated on the metallic coat surface on the surface side, which faces the membrane-electrode assembly, of the separator base material on which the metallic coat is formed.

* * * * *

UNITED STATES PATENT AND TRADEMARK OFFICE
CERTIFICATE OF CORRECTION

PATENT NO. : 8,921,005 B2  
APPLICATION NO. : 12/742341  
DATED : December 30, 2014  
INVENTOR(S) : Hirofumi Onishi et al.

It is certified that error appears in the above-identified patent and that said Letters Patent is hereby corrected as shown below:

In the Specification,  
At column 5, line 24, change "electro deposition" to -- electro-deposition --.

Signed and Sealed this  
Twenty-second Day of September, 2015

Michelle K. Lee  
*Director of the United States Patent and Trademark Office*